United States Patent
Deole et al.

(10) Patent No.: US 10,681,213 B2
(45) Date of Patent: *Jun. 9, 2020

(54) DYNAMIC SYNCHRONIZATION OF CO-EXISTING MULTICHANNEL INTERACTIONS IN A CONTACT CENTER

(71) Applicant: Avaya Inc., Santa Clara, CA (US)

(72) Inventors: Pushkar Yashavant Deole, Pune (IN); Clark Petrie, Colts Neck, NJ (US)

(73) Assignee: Avaya Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,861

(22) Filed: Dec. 21, 2018

(65) Prior Publication Data

US 2020/0045175 A1 Feb. 6, 2020

Related U.S. Application Data (63) Continuation-in-part of application No. 16/049,900, filed on Jul. 31, 2018.

(51) Int. Cl.
   *H04M 3/00* (2006.01)
   *H04M 5/00* (2006.01)
   (Continued)

(52) U.S. Cl.
   CPC ....... *H04M 3/5183* (2013.01); *H04M 3/5175* (2013.01); *H04M 3/5232* (2013.01); *H04M 3/5238* (2013.01); *H04M 2203/551* (2013.01)

(58) Field of Classification Search
   CPC ....... G06F 16/951; G10L 15/00; G06Q 10/06; G06Q 10/06316; G06Q 30/016;
   (Continued)

(56) References Cited

U.S. PATENT DOCUMENTS 5,517,563 A * 5/1996 Norell ................. H04Q 3/0025
  379/230
6,272,216 B1 * 8/2001 Vaios ................. H04M 3/5191
  379/265.01

(Continued)

OTHER PUBLICATIONS

Patent Application; U.S. Appl. No. 16/049,900 entitled Efficient Management of Co-Existing Multi-Channel Interactions in a Contact Center; filed Jul. 31, 2018 with inventors Pushkar Yashavant Deole et al.

*Primary Examiner* — Khai N. Nguyen
(74) *Attorney, Agent, or Firm* — Stevens & Showalter LLP (57) ABSTRACT

Managing redundant multi-channel interactions in a contact center includes determining that the contact center has received a first contact and a second contact via respective channels, the second contact being received while the first contact is on-going. Managing also includes identifying that the first contact and the second contact are redundant or relate to an unknown topic and inquiring of the customer as to whether to proceed with either one or both of the first contact or the second contact. Furthermore, continuing with at least one of the first contact or the second contact is performed based on the response, each of the first contact and the second contact associated with a respective wait queue. Then one or both of the contacts can be assigned to an agent.

20 Claims, 4 Drawing Sheets

(51) Int. Cl.
*H04M 3/51* (2006.01)
*H04M 3/523* (2006.01)

(58) Field of Classification Search
CPC ....... G06Q 30/02; H04L 51/02; H04L 51/046; H04L 51/24; H04L 51/30; H04M 3/2281; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5158; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04M 2203/40; H04M 2203/401; H04M 2203/2011; H04M 2203/2061; H04M 2242/00; H04M 2242/08; H04M 2242/12; H04W 4/14
USPC ............ 379/210.01, 265.01, 265.02, 265.03, 379/265.04, 265.05, 265.06, 265.07, 379/265.08, 265.09, 265.11, 265.12, 379/265.13, 265.14, 266.01, 266.02, 379/266.03, 266.04, 266.05, 266.06, 379/266.07, 266.08, 266.09
See application file for complete search history.

(56) References Cited

U.S. PATENT DOCUMENTS

| | | | | |
|---|---|---|---|---|
| 7,995,741 | B1* | 8/2011 | Blair | G06T 7/33 |
| | | | | 379/265.01 |
| 8,073,129 | B1* | 12/2011 | Kalavar | H04M 3/5233 |
| | | | | 379/265.01 |
| 8,238,541 | B1* | 8/2012 | Kalavar | H04M 3/5233 |
| | | | | 379/265.06 |
| 9,172,795 | B1* | 10/2015 | Rathod | H04M 3/42042 |
| 9,674,360 | B2* | 6/2017 | Hartman | H04M 3/5183 |
| 2002/0068582 | A1* | 6/2002 | Zawislak | H04M 3/2281 |
| | | | | 455/456.5 |
| 2007/0036131 | A1* | 2/2007 | Shaffer | H04M 3/523 |
| | | | | 370/352 |
| 2008/0177994 | A1* | 7/2008 | Mayer | G06F 9/4418 |
| | | | | 713/2 |
| 2010/0246800 | A1* | 9/2010 | Geppert | G06F 3/04817 |
| | | | | 379/265.09 |
| 2012/0140916 | A1* | 6/2012 | Kuang | H04M 3/5232 |
| | | | | 379/266.01 |
| 2013/0282744 | A1* | 10/2013 | Hartman | H04M 3/5183 |
| | | | | 707/758 |
| 2015/0189088 | A1* | 7/2015 | Surridge | G06Q 10/063112 |
| | | | | 379/265.12 |

* cited by examiner

DYNAMIC SYNCHRONIZATION OF CO-EXISTING MULTICHANNEL INTERACTIONS IN A CONTACT CENTER

CROSS-REFERENCE TO RELATED APPLICATIONS

This application is a continuation-in-part of U.S. patent application Ser. No. 16/049,900, filed on Jul. 31, 2018, the content of which is hereby incorporated by reference in its entirety.

BACKGROUND

The present disclosure relates generally to a contact center environment, and, more particularly, to managing multichannel interaction in a contact center.

Contact center operators and administrators are continually trying to optimize the contact center experience for users (also referred to herein as customers or contacts). A perpetual problem is that of load balancing, i.e. ensuring that the resources of the contact center at any given time are optimized for the number of users connected to or trying to connect to the contact center. A balance has to be struck between the cost of supplying sufficient resources (agents, supervisors, servers, applications, available connection ports, etc.) and the acceptable wait times for users of the contact center.

In many scenarios, the load is not constant and fluctuates significantly between quiet times and busy times. At busy times the users are likely to experience longer queue times and this may lead to users disconnecting due to excessive wait times.

The problem is exacerbated when users have multiple routes to access the contact center. It is common for users to attempt to generate several simultaneous contacts, e.g. by calling simultaneously from a landline, a mobile phone and a computer (using voice over IP (VoIP) applications) and to also connect to the contact center using instant messaging or web-based chat portals to the contact center. Users do this in the hopes of maximizing their chances for an early connection to an agent, e.g. by attempting to be placed multiple times in a queue for a scarce resource, such as a ticket agent, or by attempting to be placed in different queues each leading to an agent.

Such multiple connection attempts consume scarce resources of the contact center, as well as disadvantaging those other users who have made a single connection attempt. Such multiple connections also distort the activity levels of the contact center making it more difficult to gain an accurate picture of actual activity levels and requirements for servicing the contact center effectively.

BRIEF SUMMARY

One aspect of the present invention relates to a computer-implemented method in a contact center that includes determining, by a computer of the contact center, that the contact center has received a first contact via a first media channel and a second contact via a second media channel, wherein the second contact is received while the first contact is on-going and identifying, by the computer of the contact center, that the first contact and the second contact are associated with a same customer and a same topic or that a respective topic of one or both of the first contact and second contact is unknown. Next, the computer of the contact center provides a message to the customer, on at least one of the first media channel and second media channel, related to proceeding with one or both of the first contact or the second contact and in response to the message receives a response. As a result, the computer of the contact center continues with at least a particular one of the first contact or the second contact based on the response, each of the first contact and the second contact associated with a respective wait queue; and routes at least the particular one of the first contact or the second contact to a device associated with an agent of the contact center, when the particular one of the first contact or the second contact reaches a top of its associated wait queue. In certain embodiments, the respective topic of both the first contact and second contact is unknown. Furthermore, the message provided to the customer can include an inquiry to the customer as to whether to proceed with the first contact or the second contact and the message can be provided on both the first media channel and second media channel.

In accordance with this aspect, the method also includes determining a speculative topic for the first and second contacts based on historical information related to the customer.

Further, in accordance with this aspect of the invention, the method includes identifying, by the computer of the contact center, which of the first contact and the second contact was received earlier; determining, by the computer of the contact center, an historically preferred media channel for the customer, a first expected wait time (EWT) associated with the first contact and a second EWT associated with the second contact; and selecting, by the computer of the contact center, which of the first contact and the second contact is a preferred contact based on the historically preferred media channel for the customer, the first EWT, the second EWT, and which of the first contact and the second contact was received earlier. Furthermore, the historically preferred media channel of the customer can be based on previous interactions of the customer with the contact center.

In accordance with this aspect, continuing with at least one of the first contact or the second contact comprises leaving the particular one of the first contact or the second contact in a present queue position in its associated wait queue; and repositioning the other of the first contact or the second contact to a bottom queue position in its associated wait queue.

Alternatively, continuing with at least one of the first contact or the second contact comprises leaving both of the first contact or the second contact in a respective present queue position in its associated wait queue. As a result, the method can include synchronizing routing of the first contact and the second contact so that either a) only one of the first contact and second contact is routed to the device associated with the agent or b) both the first contact and second contact are routed to the device associated with the agent.

Another aspect of the present invention relates to a system in a contact center that includes a processor programmed to initiate executable operations. The executable operations can include determining that the contact center has received a first contact via a first media channel and a second contact via a second media channel, wherein the second contact is received while the first contact is on-going and identifying that the first contact and the second contact are associated with a same customer and a same topic or that a respective topic of one or both of the first contact and second contact is unknown. Next, the system provides a message to the customer, on at least one of the first media channel and second media channel, related to proceeding with one or both of the first contact or the second contact and in response to the message receives a response. As a result, the system continues with at least a particular one of the first contact or the second contact based on the response, each of the first contact and the second contact associated with a respective wait queue; and routes at least the particular one of the first contact or the second contact to a device associated with an agent of the contact center, when the particular one of the first contact or the second contact reaches a top of its associated wait queue. In certain embodiments, the respective topic of both the first contact and second contact is unknown. Furthermore, the message provided to the customer can include an inquiry to the customer as to whether to proceed with the first contact or the second contact and the message can be provided on both the first media channel and second media channel.

In accordance with this aspect, the executable operations also include determining a speculative topic for the first and second contacts based on historical information related to the customer.

Further, in accordance with this aspect of the invention, the executable operations include identifying which of the first contact and the second contact was received earlier; determining an historically preferred media channel for the customer, a first expected wait time (EWT) associated with the first contact and a second EWT associated with the second contact; and selecting which of the first contact and the second contact is a preferred contact based on the historically preferred media channel for the customer, the first EWT, the second EWT, and which of the first contact and the second contact was received earlier. Furthermore, the historically preferred media channel of the customer can be based on previous interactions of the customer with the contact center.

In accordance with this aspect, continuing with at least one of the first contact or the second contact comprises leaving the particular one of the first contact or the second contact in a present queue position in its associated wait queue; and repositioning the other of the first contact or the second contact to a bottom queue position in its associated wait queue.

Alternatively, continuing with at least one of the first contact or the second contact comprises leaving both of the first contact or the second contact in a respective present queue position in its associated wait queue. As a result, the executable operations can include synchronizing routing of the first contact and the second contact so that either a) only one of the first contact and second contact is routed to the device associated with the agent or b) both the first contact and second contact are routed to the device associated with the agent.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In the present description, an "agent" and a "resource" can both be used to describe a person working at the contact center handling contacts.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communications may be by way of any communications medium such as, but not limited to, a telephone call, email, instant message, web chat, and the like. The terms "user" and "customer" denote a party external to the contact center and are used herein to refer to the other party to a contact or a communications session. A user or customer may include, for example, a person having a commercial relationship with the contact center or with a business represented by the contact center.

For each contact received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed. For the sake of brevity, the term "contact" is sometimes used to mean a "contact object" when it is clear from the context that a computer or processor is automatically interacting with or manipulating the contact object.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure may be separately claimed.

The terms "switch," "server," "contact center server," or "contact center computer" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

Figure 1:
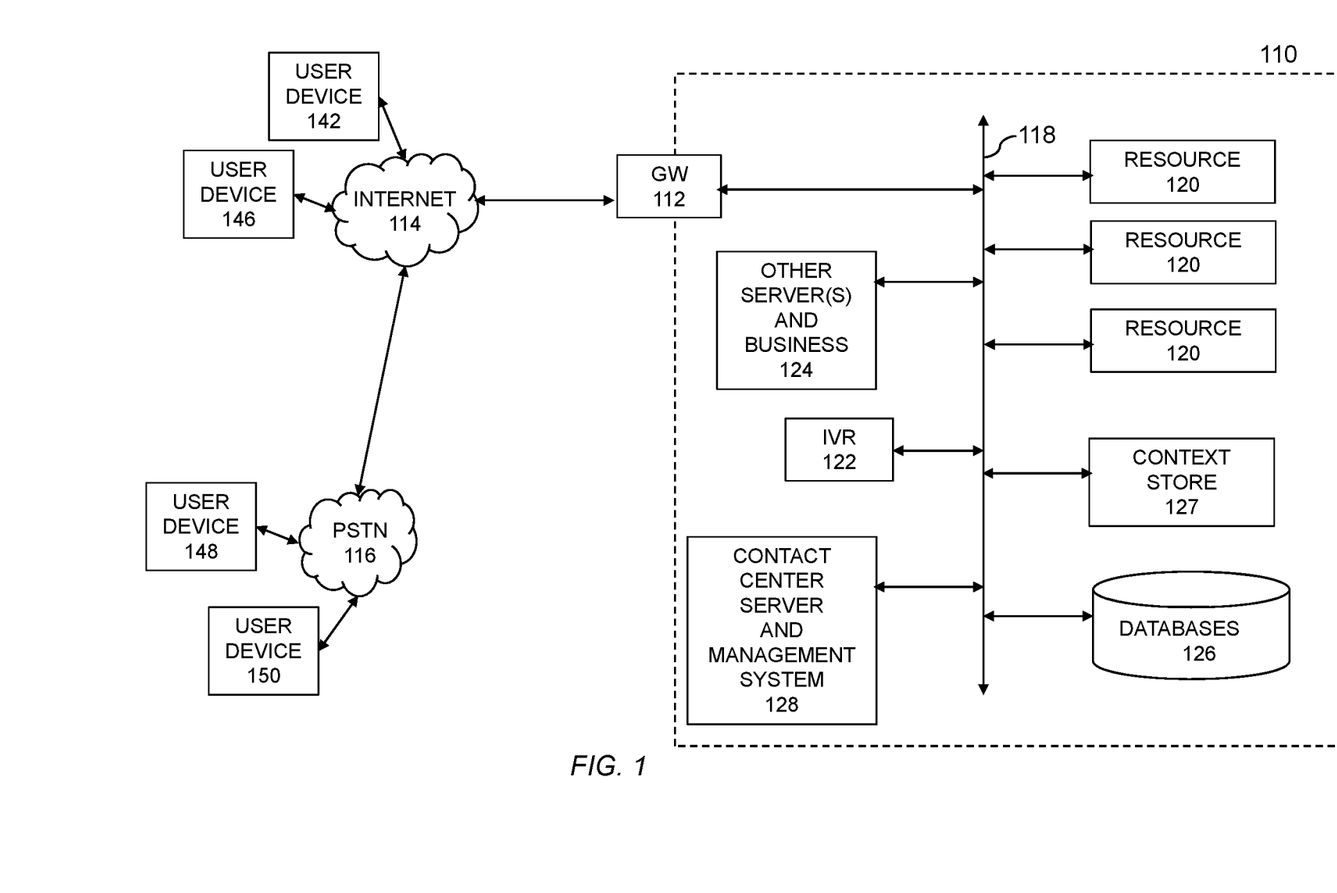
FIG. 1 and FIG. 2 provide an example contact center environment and are provided to illustrate a typical computer-based enterprise architecture in which embodiments in accordance with the present disclosure can be implemented.
Figure 2:
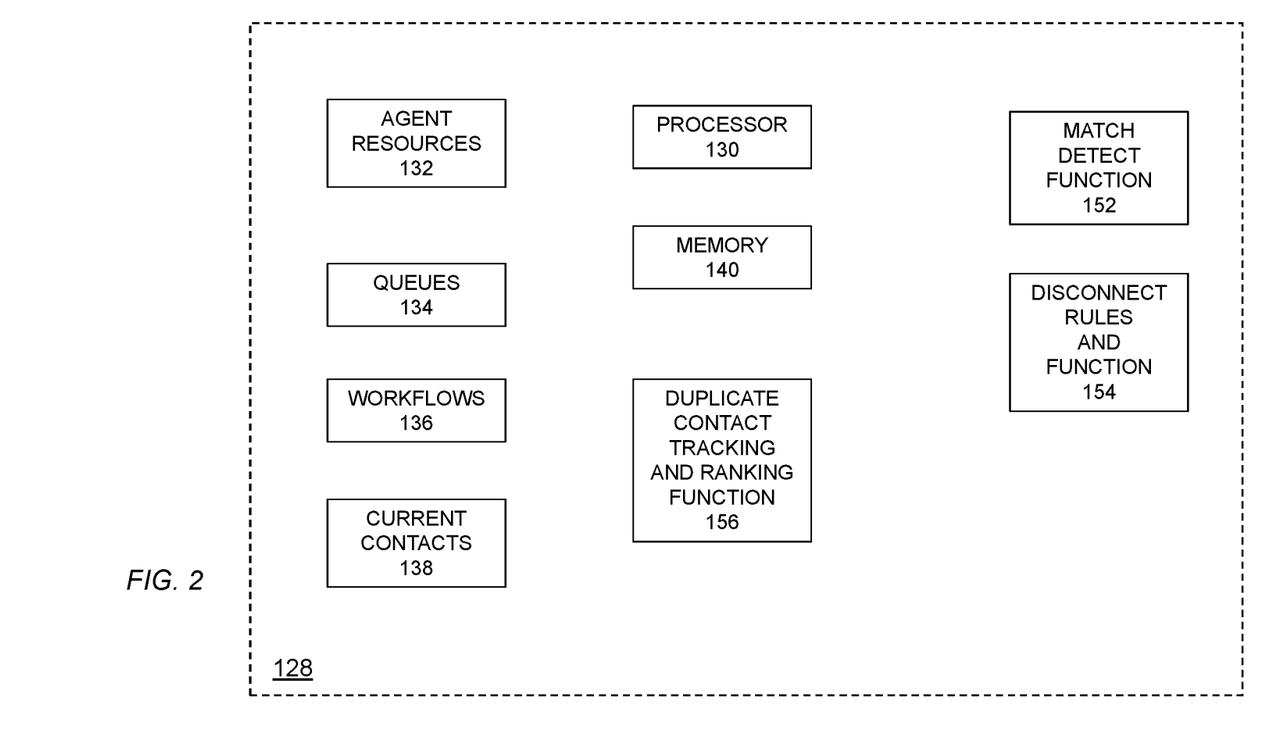

FIG. 1 and FIG. 2 provide an example contact center environment and are provided to illustrate a typical computer-based enterprise architecture in which embodiments in accordance with the present disclosure can be implemented.

In FIG. 1 there is indicated, generally at 110 a contact center system for implementing the method of managing contacts described herein. The contact center 110 includes a gateway 112 providing connectivity to the Internet 114. As shown in FIG. 1, the contact center 110 can connect via the Internet 114 to a public switched telephone network 116, although there may equally be a direct telephony trunk connection in a known manner.

The gateway 112 can incorporate known communications server functionality such as a telephony switch, a SIP (session initiation protocol) server, an IM (instant messaging) server, an email server, a video telephony server, a web server, and so forth, such that communication is enabled using multiple media types between the contact center 110 and the Internet 114. A contact center LAN (local area network) 118 can be provided for communication within the contact center 110 between various resources of the center including a plurality of agent workstations 120 used by human agents to interact with contact center users or customers, automated workflow processes such as an IVR (interactive voice response) system 122, business systems and processes 124, a customer database 126, and a contact center management system 128.

It will be appreciated that the aforementioned components of the contact center 110 can incorporate any conventional functionality of a contact center. So for example, the illustrated IVR system 122 can serve music and other media on demand as part of an automated IVR and queuing process. Similarly, the business systems 124 can incorporate functions such as billing, payment, product ordering and dispatch, account activation, ticket allocation, or any other required business system which may be needed to serve the needs of the contact center and its customers.

The customer database 126 can be populated with records of users or customers of the contact center, and such records will typically include name and address details, usernames, passwords, card payment details, account numbers, telephone numbers and other contact details including email and IM addresses, known IP addresses, and so on. New records are created for new contacts arriving at the contact center if they cannot be associated with existing records, or where a contact is recognized as originating from a known existing customer, then the contact record for that particular session may include a reference to the customer database record of the customer in question.

The contact center 110 can also include a context store 127. The context store 127 can provide a centralized data cache to the various applications in the contact center 110. The context store 127 can, for example, provide a RESTful Web Service API so that other applications can set or get context information. While various database schemes may be contemplated, the context information stored about a contact is stored so that the information can be searched and retrieved based on any of a variety of data stored therein. For example, each entry in the context store can include a) a ContextID which is a text field that contains a unique identifier for the context entry; b) the data, which can include multiple key-value pairs; c) the topic or subject matter to which the contact pertains; d) an identity or unique UserID associated with the contact; and e) a GroupID which allows logical groups of related context entries to be created.

As described herein, various data, or context, about a contact can be generated, retrieved and stored. This contextual information can include present attributes about the contact, a device associated with the contact, a location of a user associated with the contact, an identity of the user associated with the contact; devices and/or locations associated with past contacts involving the associated user or user device, social media information about the user associated with the contact, and past purchases, past inquiries, group affiliation and demographic information about the user associated with the contact. The contextual information can also include various information about contact center resources, agents, and problem resolution associated with past interactions with the user associated with a contact. Although the context store 127 is shown as a separate element in FIG. 1, the context store 127 can be part of the contact center management system 128 or another one of the systems of the contact center 110.

As shown in FIG. 2, the contact center management system 128 can incorporate a processor 130 which manages several records and subsystems required to operate the contact center 110 in a known manner, including a record of available agent resources 132, a queue management subsystem 134, a workflow management subsystem 136 (which determine the steps involved in treating a contact such as routing to IVR 122, allocation to a queue 134, and allocation to an available agent 120), and a dynamically updated contact record 138 of contacts which are currently live at the contact center. The latter record may also include historical records of contacts which have been terminated. The processor 130 has access to a memory 140 as part of an overall implementation within a computer system.

Returning to FIG. 1, the contact center 110 can thus operate in a conventional mode, receiving contacts from users outside the contact center, such as a contact from a mobile phone 142 via a cellular phone network connected to the Internet 114, or a contact from a computer user 146 (who may communicate using telephony, instant messaging, email, interaction with a web server, or in any other suitable manner), or from telephone callers 148, 150 connected to the PSTN 116 or to the Internet 114.

When a contact is received at the gateway 112, a new contact record is created in the contact record area 138, and the contact center management system 128 can then route the communications session associated with the contact to the various resources of the contact center 110 in accordance with the workflows 136, such as by using an IVR session 122 to deduce the nature of the contact and the skillsets required to handle it, allocating the contact to a suitable queue 134, and when an agent 120 is available to handle the contact, placing the agent in communication with the contact. The contact center 110 will also generally incorporate further components which are conventional and typical such as a call recording mechanism, conferencing mechanisms, supervisor functionality, statistics and records, etc., none of which are shown for conciseness.

As mentioned earlier, with the advent of multi-channel contact centers, there is also a need to manage the co-existing multi-channel interactions (initiated by the same customer for the same query) more efficiently by the contact center systems with little adverse impact to the user experience. Embodiments in accordance with the principles of the present disclosure manage these types of interactions by efficiently handling the multiple interactions in order to conserve the contact center resources and at the same time provide the best possible user experience to the customer.

As shown in FIG. 2, the contact center management system 128 can include a match detection function 152 that, as explained in more detail below, determines that the contact center 110 presently has at least two interactions or contacts that involve the same customer and are related to the same topic. These types of contacts can be considered to be "multiple" contacts, "duplicate" contacts, or "redundant" contacts (however, not every multiple contact is necessarily a duplicate or redundant contact). Thus, this function 152 can determine that the contact center 110 has received a first contact via a first media channel and a second contact via a second media channel, wherein the second contact is received while the first contact is on-going and can identify that the first contact and the second contact are associated with a same customer and related to a same topic.

In some instances the match detect function 152 can include artificial intelligence or other analytical processing that is used to determine that the receiving of multiple contacts from a particular user is uncharacteristic of that user. Based on historical data about how this customer has previously interacted with the contact center allows for a determination that the present behavior statistically deviates from the previous behavior. Under these circumstances, the function 152 can initiate an alert to an agent to conduct an outbound contact to try to establish communication with the customer as quickly as possible.

The contact center management system 128 also includes a function 156 for duplicate contact tracking and ranking. This function 156 determines a preferred contact or preferred interaction from among the multiple contacts. As explained in more detail below, certain information about each of the multiple contacts is tracked so that the multiple contacts can be ranked such that the top-ranked contact is considered a preferred contact. The duplicate contact tracking and ranking function 156 can send an inquiry to the customer informing them that the contact center is aware of the multiple contacts and has selected one of the contact as the preferred contact. The inquiry can also ask for the customer's consent to proceed with the preferred contact and terminate the other contacts. Preferably, the inquiry is sent on the respective media channels corresponding to the multiple contacts other than the media channel corresponding to the preferred contact. The user can reply by giving consent or by selecting to proceed with another one of the multiple contacts other than the initially-identified preferred contact. Thus, as presently claimed, this function 156 provides an inquiry to the customer, on at least one of the first media channel and second media channel, as to whether to proceed with the first contact or the second contact (i.e., the preferred contact) and receives, in response to the inquiry, a response from the customer.

The contact center management system 128 also includes disconnect rules and function 154. In accordance with this function 154, the operation of the contact center management system 128 depends on whether the customer consents to continue with the preferred contact, chooses to continue with a different contact, or provides no reply at all. If the customer consents, then the other contacts are closed and the preferred contact remains in its current position in its associated wait queue. If the customer chooses a different contact, then all the other redundant contacts are closed including the initially-identified preferred contact. The system 128 continues with the customer-selected contact by retaining that contact in its current position in its associated wait queue. When the customer does not reply at all, then the system 128 can continue with the preferred contact by maintaining its current queue position in its associated wait queue. However, for all of the other "non-preferred" contacts, each is repositioned to a bottom position in the respective wait queue corresponding to the media channels associated with the non-preferred contacts. Thus, as presently claimed, this function 154 continues with one of the first contact or the second contact based on the response from the customer, with each of the first contact and the second contact being associated with a respective wait queue. As the one of the first contact or the second contact reaches a top of its associated wait queue, the system 128 can then route the one contact to a device associated with an agent of the contact center.

As one example scenario, a customer can initially make a call to the contact center 110 and is then presented with one or more IVR options. The aforementioned voice interaction is just one example type of interaction. Another example may be that the customer can initiate a chat interaction through any of many social integration channels instead of a voice interaction.

As is conventional with contact centers, the customer can make appropriate selections of the IVR options which results in the customer getting placed in an appropriate queue in contact center system 128 waiting for a next available agent to attend the call. However, while the customer is waiting for the agent to become available, the customer can initiate another interaction with the contact center through another channel such as, for example, FACEBOOK/LINE/WHATSAPP/WECHAT/TWITTER or through more than one of these channels.

Based on the channel used by the customer for the subsequently initiated interaction(s), the customer is asked to select from options similar to IVR options provided for voice interactions. Furthermore, similar to voice interactions, based on the selections made by the customer, the contact center system 128 determines an appropriate queue for the second contact or interaction.

Based on the input provided by the customer the contact center management system 128 can determine that the customer in the second contact or interaction is the same as a customer in a different, currently-ongoing interaction or contact. This determination can be made based on information the customer explicitly provides such as an account number, social security number account name, user ID, etc. The determination can also be made based on other information such as an IP address, a device name or device ID, etc. U.S. Pat. No. 9,674,360, assigned to the owner of the present application and the disclosure of which is incorporated herein by reference in its entirety, discloses example techniques and methods for a contact center to determine if two concurrent contacts involve the same customer.

Furthermore, the contact center management system 128 can determine that two interactions or contacts that involve the same customer also relate to the same topic. Based on the inputs provided by the customer, the contact center management system 128 can determine that a subsequent interaction (e.g., via TWITTER) is about the same topic (i.e., the same query) as a prior-initiated voice interaction (or other prior interaction/s initiated by the same customer). Alternatively, the contact center system 128 can, for example, use the context store 127, described earlier, to determine the context of each interaction and make the determination about the query or the topic of each interaction. The terms 'topic' and 'query' are used interchangeably herein as a way to refer to a semantic context of an interaction which the system 128 can use when determining if an interaction is a duplicate interaction.

Thus, the contact center system 128 can derive knowledge of multiple interactions initiated by the same customer for the same topic/purpose over multiple media channels. As a result, the duplicate tracking function of the contact center system 128 can logically organize the co-existing interactions initiated by the same customer. The following table or chart is an example of how the different interactions or contacts could be logically arranged and monitored or tracked.

| Contact ID | 100001 | 100007 | 101001 | 101020 |
|---|---|---|---|---|
| User ID | J. Smith | J. Smith | J. Smith | J. Smith |
| Topic | Tablet | Payment | Tablet | Tablet |
| Queue Length | 9 minutes | 4 minutes | 2 minutes | 6 minutes |
| Start Time | 8:58 | 9:00 | 9:01 | 9:02 |
| Channel | Voice | Facebook | Chat | Twitter |

If two co-existing interactions are for different topics (i.e., different queries) then those interactions can be filtered out from the logical chart and can be processed in a normal way as if they are two different interactions. In the above table or chart, the contact having an ID of "100007", although associated with the same customer as the other three contacts, is related to a different topic than the other three contacts and, thus, that contact can be removed from the chart and handled as a conventional contact.

However, the other three contacts (i.e., 100001, 101001 and 101020) do relate to the same topic and, in accordance with the principles of the present disclosure, these co-existing interactions for the same topic are preserved in the logical chart. The contact center system 128 can determine the expected wait times for each of the interactions preserved in the logical chart and can rank or order the interactions or contacts according to a queue length or expected wait time (EWT). In other words, the contact having the shortest EWT is ranked highest. Another piece of information that the contact center system 128 can include in the logical chart is the respective start time of each of the interactions in order to determine which interaction was initiated first, which presumably is the preferred interaction channel for the customer. In the above example chart, there are three contacts that relate to the same topic from the same user. One of ordinary skill will readily recognize that two, three, four or even more duplicate contacts can be received at a contact center in accordance with the principles of the present disclosure.

The contact center system 128 can analyze the logical chart to determine whether or not the interaction at the top (with least EWT) is the first interaction initiated by the customer. If so, then this interaction is considered to be a preferred interaction. If the top-ranked interaction or contact is not the first-initiated interaction or contact, then the contact center system 128 can determine the difference between the EWT of top-ranked interaction and the first-initiated interaction. Based on this difference, the contact center system 128 can determine which interaction is to be considered a preferred interaction. In doing so, the contact center system 128 determines whether to continue with the interaction that was initiated first by the customer (presumably the customer's preferred channel) or to give a preference to any of the interactions that were initiated later but have a significantly lower, or shorter, EWT. The phrase "significantly lower" or "significantly shorter" can be a predetermined criteria that is configurable in the contact center system 128. It can be a relative criteria such as "is the EWT for the lower-ranked interaction more than 3 times longer than the EWT of the top-ranked interaction?" It can also be an absolute criteria such as "is the EWT for the other interaction more than 2 minutes longer than the top-ranked interaction?" The determination of "significantly shorter" can be based on historical contact center information such as, for example, how long does a customer typically stay waiting on a media channel before self-terminating the contact (out of frustration). If the difference in EWTs between two interactions is, for example, at least 50% of that historically-derived "hang-up" time, then the lower EWT is considered "significantly lower".

For example, in a scenario where the customer calls the contact center and later initiates a chat through FACEBOOK, the EWT for the call is 2-3 min whereas the EWT for the chat through FACEBOOK is 30-40 seconds. In this example scenario, the contact center system 128 can determine that, based on the significantly longer EWT for the call, giving preference to the FACEBOOK interaction may benefit the customer even though the call was initiated first. In another scenario, the customer may call the contact center first and may later initiate a chat through WHATSAPP. In this second example scenario, an expected wait time for the call is 60-90 seconds whereas an expected wait time for the WHATSAPP interaction is 30-40 seconds. Since the difference in EWT for the two interactions is not that significant, the contact center system 128 can make a decision to continue with preference to voice (call) interaction which presumably is the preferred channel by customer.

Based on which interaction the contact center system 128 determines to be the preferred interaction, the contact center system 128 can provide feedback to the customer via the different channels on which the customer has initiated different interactions. The feedback informs the customer about which media channel and interaction is considered to be the preferred interaction and media channel. The feedback can also ask the customer for approval or consent of the choice for the preferred interaction. The feedback may also include an identification of the other interactions that are not selected to be the preferred interaction and can provide the respective EWT for each of the interactions. Thus, the contact center system 128 can ask for the customer's consent to continue with the preferred interaction and to allow the other interactions to be closed or terminated. If the customer is satisfied with the choice of interaction made by the contact center system 128, then the customer can opt to go with the system's choice and can provide consent to the system to close the other redundant interaction(s) on other channels. As a result, the contact center system 128 can close the redundant interaction(s).

Alternatively, the customer may want to override the choice made by the contact center system 128 and wish to opt for one of the other interactions that was not selected to be the preferred interaction. In this instance, the customer can select one of the other interactions to continue and provide consent for the contact center system 128 to close all the other interactions on other channels. In this case, the contact center system 128 maintains the customer's choice of interaction and closes interactions on other channels. If the customer does not provide any answers when presented with the feedback on the different media channels, the contact center system may, by default, continue with the preferred interaction and close any other interaction(s); however, this would likely adversely impact the user experience. Thus, as an alternative that improves the user experience, the contact center system 128 can maintain the preferred interaction in the present position it occupies in its wait queue but push all other interactions to the end position in their respective wait queues. The contact center system 128 can be configured to either inform the customer of the repositioning of the other interactions or to not inform the customer that one or more interactions were repositioned. One benefit of this is that other customers with, for example, social network interactions (without any other redundant co-existing interaction) are given preference over the customer with redundant co-existing interactions in which their social network interaction is not selected as the preferred interaction.

In the above example scenarios, the EWT for each interaction was used to determine a preferred interaction by the system 128. However, other attributes of the interactions can also be used by the system 128 to determine a preferred interaction. There are a number of key performance indicators (KPIs) and/or service level agreement (SLA) parameters that are monitored within a contact center. One of the duplicate interactions can be selected, for example, as the preferred interaction on the basis of maximizing the likelihood that an SLA is satisfied or on the basis of improving one or more KPIs.

From the perspective of the contact center agent, once the preferred interaction reaches the top of the wait queue and is assigned to an agent, the agent can be notified about other co-existing interactions. The notification can be in the form of a visual notification pushed to the agent's desktop application or another device associated with the agent. Doing so provides the agent the opportunity to inform or ask the customer to close the open interactions initiated through other channels since they are for the same query/topic as determined by the contact center system 128. In response, the customer may indicate that the other interactions are for a different topic. If this is the case, then the agent can advise the customer to select appropriate options so that the interaction can be properly identified in order to be assigned to an appropriate topic queue in the contact center system 128.

In some instances, a customer reaching out to a contact center on multiple channels at the same time might mean that the customer is desperately looking to reach out to the contact center due to some urgency. Accordingly, the contact center 110 can employ data analytics or artificial intelligence based techniques to make the determination that the observed behavior of the customer is uncharacteristic compared to their past behavior. For example, a medical hospital contact center could use the past data about the customer to determine that this customer has never initiated such simultaneous interactions on multiple channels in the past. As another example, a road-side assistance contact center could employ a sentiment analysis engine and infer from the customer sentiment that the customer is highly agitated and stressed and therefore the customer is trying to receive the earliest possible response from the contact center by initiating multiple redundant interactions. In such cases, the contact center system 128 may initiate a new outbound call/interaction with the customer in order to proactively reach out to the customer at the earliest possible time.

Figure 3:
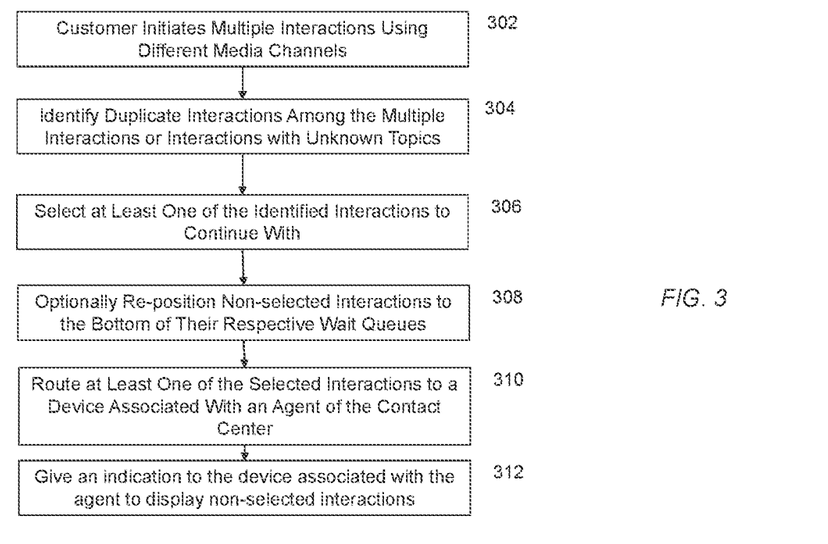
FIG. 3 is a flowchart of an example method of managing co-existing multi-channel interactions in a contact center in accordance with the principles of the present disclosure.

FIG. 3 is a flowchart that briefly summarizes the above-described method of managing co-existing multi-channel interactions in a contact center in accordance with the principles of the present disclosure. In step 302, the customer has initiated multiple contacts or interactions with the contact center utilizing different media channels such as voice, web chat, short message service, social media, email, video, web collaboration, etc. In particular, these multiple interactions were established in such a way that they are concurrently being processed at the contact center.

As described above, a system of the contact center determines, in step 304, that among the multiple interactions there are at least two that are duplicate or redundant interactions. The system of the contact center can make this determination by identifying that two interactions appear to be from the same customer and relate to the same topic or subject matter. As part of initially processing an incoming contact, the contact center can identify a customer in an attempt to improve the present customer experience based on past interactions and can identify a destination within the contact center that is the best choice for handling the present contact. In accordance with the principles of the present disclosure, these two pieces of information can be used to help detect when two interactions (on different media channels) are duplicate interactions. As discussed below, a determination can also be made that a topic related to an interaction or contact may be unknown. As explained in detail below, contacts for which a topic is unknown can in some instances be handled and tracked similar to duplicate contacts or interactions.

Next in step 306, the system of the contact center can select one of the duplicate contacts or interactions to continue with. In particular, this selection can be made with the assistance of input from the customer. The system can first identify a preferred contact from among the duplicate contacts. This identification can be based on features of a contact such as the earliest-received contact from among the duplicate contacts and the respective EWT for each of the contacts. The system can use the media channels corresponding to the non-preferred contacts to inform the customer of the existence of the multiple contacts, identify the preferred contact, and solicit consent to close all of the non-preferred contacts. Based on the user's response, as explained above, the system of the contact center can a) continue with the preferred contact or b) continue with a different one of the duplicate contacts, and, in either case, close all of the duplicate contacts except for the selected contact that the system continues with.

One option or alternative to closing some or all of the non-selected duplicate contacts is to, in step 308, reposition each of those contacts to the bottom of the respective wait queue associated with the appropriate media channel. In step 310, the selected contact will eventually arrive at the top position in its associated wait queue where it can then be routed to a device associated with an agent of the contact center. Also, in the case when some non-selected contacts were repositioned in their respective wait queues, the agent can be notified, in step 312, of the still pending contacts or interactions and confirm with the customer that these contacts are duplicate contacts and that each will be closed.

Figure 4:
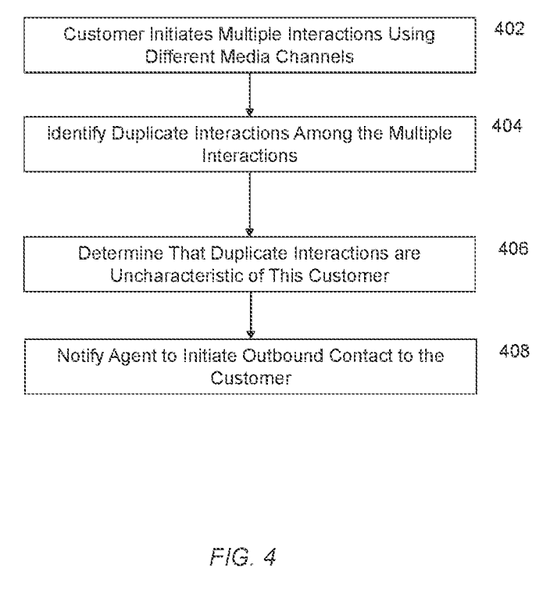
FIG. 4 is a flowchart of an example method of initiating an outbound contact in response to redundant interaction in accordance with the principles of the present disclosure.

FIG. 4 is a flowchart of an example method of initiating an outbound contact in response to redundant interaction in accordance with the principles of the present disclosure. Steps 402 and 404 are substantially the same as steps 302 and 304 of FIG. 3. However, in step 406, the system of the contact center analyzes past behavior and interactions of the particular customer determined to now have duplicate interactions or contacts presently being processed at the contact center. Sentiment analysis can determine that, compared to previous interactions, that the customer is presently agitated or stressed. Or, artificial intelligence-based analysis can determine that the duplicate records presently being processed are characteristically different than past interactions of the customer with the contact center. In either case, the system can at step 408 alert an agent to proactively initiate an outbound contact to the customer.

In the above description, the match detect function was able to determine there were duplicate contacts or interactions by determining that there are currently at least two contacts from the same person regarding or relating to the same topic. However, there may be instances in which the contact center management system 128 is unable to determine with a high degree of confidence a topic associated with an incoming contact. The analysis performed by the contact center management system 128 may determine a likely topic associated with a contact in a manner that assigns a confidence score indicative of how certain that determination is correct. There may be, for example, a system configurable setting that if the confidence score is below that setting, then the topic for the contact is considered to be unknown or undetermined.

For instance, customers are often presented with a multiple-choice question about the purpose of their call, and sometimes none of the choices adequately describes the customer's issue. In this case, the customer may choose a topic that does not describe the problem. Or, the customer may instead request to reach a representative without answering the multiple-choice question. Some systems use natural language interfaces that allow the customer to speak or type the nature of their call/contact and the system will interpret the topic from the customer's input; here, the system may fall short of adequately inferring the topic of concern to the customer. For these reasons, in some embodiments the topic of a call may not be the basis used for associating two contacts from the same individual or customer.

In one scenario, the contact center management system 128 may determine that there are multiple contacts or interactions from the same person but the topic related to each of those contacts is unknown. In this case, the contact center management system 128 can retrieve information related to past interactions involving this customer, such as, for example from the context store 127 in order to select a speculative topic for each of the duplicate contacts. From this retrieved information, the contact management system can determine the most-frequent topic for this customer or the most-recent topic for this customer. Alternatively, the contact center management system can determine a popular topic that is currently trending higher for other customers that share similar characteristics with this customer. Similarly, the contact center management system may be aware of a recent event (e.g., release of new software version) that may impact this customer. Regardless of the manner in which it is determined, the speculative topic is assigned as the topic related to each of the multiple interactions and the match detect function 152 can then determine that the multiple interactions are duplicate contacts that can be handled as discussed above with respect to FIGS. 2-4.

In another scenario, the customer may have multiple interactions or contacts and some have a known topic but some have an unknown or undetermined topic. If the contact or contacts with known topics all relate to the same topic, then the contacts with the unknown contacts can be associated with the contacts having a known topic so that all the contacts are considered to be duplicate contacts. If there are multiple contacts that relate to different known topics, then the contacts with the unknown topic can be associated with the contacts having the most-common known topic. For example, if there are four contacts from the same customer with two relating to "tablet", one relating to "loan", and one unknown, then the contact with unknown topic can be associated with the contacts related to "tablet". In another example, if there are three contacts with one relating to "tablet", one relating to "loan", and one unknown, then the contact with unknown topic can be associated with either of the other contacts related to a known topic by some arbitrary method such as randomly or alphabetically. Thus, the contacts that are associated with one another are treated as duplicate contacts and are handled in the manner described above with respect to FIGS. 2-4.

In yet another scenario, the contact center management system 128 may determine that there are multiple contacts originating from the same enterprise or location (e.g., a company) but that they may involve different customers. In this instance, there may be some contacts with known topics and some with unknown topics. The contact center management system 128 can use similar principles as described above with respect to individuals to associate contacts related to an unknown topic from the same enterprise (or location) with contacts having a known topic so that the contacts can be treated as duplicate contacts.

In addition to using EWT or optimizing KPIs/SLAs, as discussed above, for aiding in determining the preferred interaction, the contact management system 128 and the ranking function 156 may have access to historical data related to a customer with duplicate contacts that allows selection of a preferred interaction. The analysis performed by the contact center management system 128 may determine from past interactions that a customer prefers one channel over the others in a manner that assigns a confidence score indicative of how certain that determination is correct. There may be, for example, a system configurable setting that if the confidence score is above that setting, then the preferred channel for the contact is considered to be known. In this instance, the contact management system 128 may select that contact of the preferred channel as the preferred interaction from among the duplicate contacts without sending an inquiry to the customer.

As discussed above, a customer can be asked consent to a preferred channel and close the contacts on the remaining channels. In some instances, a customer may not be certain which channel they prefer as the preferred channel. Also, in the case where the sentiment analysis has determined the customer may be in a panicked state, it may not be beneficial to select only a single preferred channel. Priority or high-level customers may also be allowed to avoid selecting only a single channel. Thus, in some instances duplicate contacts may be allowed to proceed in two different queues without repositioning any of the contacts in their respective queues. Using similar techniques described above for determining a preferred interaction and its associated channel, multiple preferred channels can be selected from amongst the duplicate contacts. The contact center management system 128 can determine that there are, for example, two preferred channels for a customer with duplicate contacts (e.g., FACEBOOK chat and voice). The contact management system 128 can send a notification on the preferred channels that multiple interactions have been detected but that they will be maintained. The system 128 may or may not provide further explanation (e.g., panic, emergency, priority customer).

The contact tracking and ranking function 156 will not treat the contacts in any of the preferred channels as a higher priority than the other but will allow both to travel through their respective queues as if they were not duplicate contacts. However, the two (or more) contacts will be tracked such that when one of the duplicate contacts is assigned to an agent, then the other duplicate contacts are not assigned. In some instances, an agent may be able to handle both (or more) of the preferred channels. In this case, the contact center management system 128 may assign the duplicative to the same agent concurrently.

In the methods discussed above, a preferred interaction is identified and the customer is requested to terminate the non-preferred modes of contact, When the customer consents, the preferred contact continues and the others are terminated. However, it may be desirable to provide responses to non-preferred modes or channels instead of allowing the customer to simply terminate them. For example, one of the customer's duplicate contacts may be through a social media site where the customer's issue may be publicly visible. It may be advantageous to provide a public response in such cases, even if the matter is handled by another, preferred channel. Even if the non-preferred channel is not publicly visible, it may be desirable to provide a response after the fact based on the resolution by the preferred channel. This approach can be beneficial for channels in which a delayed response is acceptable. So, for these channels, the customer would receive a response indicating the contact center management system 128 recognizes a preferred channel contact is in queue, and that a response to the non-preferred channel will be provided based on the results of the preferred contact. Then, when the resolution is reached in the preferred channel, each of the non-preferred channels receives a follow up response. That response can be based on the resolution reached and may express appreciation, summarize aspects of the communication in the preferred channel, provide commitments, next steps, or some other follow up content. These non-preferred channels could be put in a special status linking a follow up response to the resolution of the preferred channel or could simply be placed in queue in such a way that they do not make it to the top of the queue until after the preferred channel contact is resolved.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A computer-implemented method in a contact center, comprising:
   determining, by a computer of the contact center, that the contact center has received a first contact via a first media channel and a second contact via a second media channel, wherein the second contact is received while the first contact is on-going;
   identifying, by the computer of the contact center, that the first contact and the second contact are associated with a same customer and a same topic or that a respective topic of one or both of the first contact and second contact associated with the same customer is unknown;
   providing, by the computer of the contact center, a message to the customer, on at least one of the first media channel and second media channel, related to proceeding with one or both of the first contact or the second contact;
   in response to the message, receiving, by the computer of the contact center, a response;
   continuing, by the computer of the contact center, with at least a particular one of the first contact or the second contact based on the response, each of the first contact and the second contact associated with a respective wait queue; and
   routing, by the computer of the contact center, at least the particular one of the first contact or the second contact to a device associated with an agent of the contact center, when the particular one of the first contact or the second contact reaches a top of its associated wait queue.

2. The computer-implemented method of claim 1, wherein the respective topic of both the first contact and second contact is unknown.

3. The computer-implemented method of claim 2, further comprising:
   determining a speculative topic for the first and second contacts based on historical information related to the customer.

4. The computer-implemented method of claim 1, further comprising:
   identifying, by the computer of the contact center, which of the first contact and the second contact was received earlier;
   determining, by the computer of the contact center, one or more of an historically preferred media channel for the customer, a first expected wait time (EWT) associated with the first contact, a second EWT associated with the second contact, a contact center key performance indicator (KPI) related to the first contact or the second contact, a contact center service level agreement (SLA) parameter related to the first contact or the second contact; and
   selecting, by the computer of the contact center, which of the first contact and the second contact is a preferred contact based on one or more of the historically preferred media channel, the first EWT, the second EWT, the KPI, the SLA parameter and which of the first contact and the second contact was received earlier.

5. The method of claim 4, wherein the historically preferred media channel of the customer is based on previous interactions of the customer with the contact center.

6. The computer-implemented method of claim 1, wherein the message comprises an inquiry to the customer as to whether to proceed with the first contact or the second contact.

7. The computer-implemented method of claim 1, wherein the message is provided on both the first media channel and second media channel.

8. The computer-implemented method of claim 1, wherein continuing with at least one of the first contact or the second contact comprises:
   leaving the particular one of the first contact or the second contact in a present queue position in its associated wait queue; and
   repositioning the other of the first contact or the second contact to a bottom queue position in its associated wait queue.

9. The computer-implemented method of claim 1, wherein continuing with at least one of the first contact or the second contact comprises:
   leaving both of the first contact or the second contact in a respective present queue position in its associated wait queue.

10. The computer-implemented method of claim 9, further comprising:
    synchronizing routing of the first contact and the second contact so that either a) only one of the first contact and second contact is routed to the device associated with the agent or b) both the first contact and second contact are routed to the device associated with the agent.

11. A system in a contact center, comprising:
    a processor programmed to initiate executable operations comprising:
       determining that the contact center has received a first contact via a first media channel and a second contact via a second media channel, wherein the second contact is received while the first contact is on-going;
       identifying that the first contact and the second contact are associated with a same customer and a same topic or that a respective topic of one or both of the first contact and second contact associated with the same customer is unknown;
       providing a message to the customer, on at least one of the first media channel and second media channel, related to proceeding with one or both of the first contact or the second contact;

in response to the message, receiving a response;

continuing with at least a particular one of the first contact or the second contact based on the response, each of the first contact and the second contact associated with a respective wait queue; and routing at least the particular one of the first contact or the second contact to a device associated with an agent of the contact center, when the particular one of the first contact or the second contact reaches a top of its associated wait queue.

12. The system of claim 11, wherein the respective topic of both the first contact and second contact is unknown.

13. The system of claim 12, wherein the processor is programmed to initiate executable operations further comprising:

determining a speculative topic for the first and second contacts based on historical information related to the customer.

14. The system of claim 11, wherein the processor is programmed to initiate executable operations further comprising:

identifying which of the first contact and the second contact was received earlier;

determining one or more of an historically preferred media channel for the customer, a first expected wait time (EWT) associated with the first contact, a second EWT associated with the second contact, a contact center key performance indicator (KPI) related to the first contact or the second contact, a contact center service level agreement (SLA) parameter related to the first contact or the second contact; and selecting which of the first contact and the second contact is a preferred contact based on one or more of the historically preferred media channel, the first EWT, the second EWT, the KPI, the SLA parameter and which of the first contact and the second contact was received earlier.

15. The system of claim 14, wherein the historically preferred media channel of the customer is based on previous interactions of the customer with the contact center.

16. The system of claim 11, wherein the message comprises an inquiry to the customer as to whether to proceed with the first contact or the second contact.

17. The system of claim 11, wherein the message is provided on both the first media channel and second media channel.

18. The system of claim 11, wherein continuing with at least one of the first contact or the second contact comprises:

leaving the particular one of the first contact or the second contact in a present queue position in its associated wait queue; and repositioning the other of the first contact or the second contact to a bottom queue position in its associated wait queue.

19. The system of claim 11, wherein continuing with at least one of the first contact or the second contact comprises:

leaving both of the first contact or the second contact in a respective present queue position in its associated wait queue.

20. The system of claim 19, wherein the processor is programmed to initiate executable operations further comprising:

synchronizing routing of the first contact and the second contact so that either a) only one of the first contact and second contact is routed to the device associated with the agent or b) both the first contact and second contact are routed to the device associated with the agent.

* * * * *